US009065892B2

(12) United States Patent
Baek

(10) Patent No.: US 9,065,892 B2
(45) Date of Patent: Jun. 23, 2015

(54) RECEIVER AND MOBILE COMMUNICATION TERMINAL INCLUDING THE RECEIVER

(71) Applicant: Pantech Co., Ltd., Seoul (KR)

(72) Inventor: Sun-Woo Baek, Seoul (KR)

(73) Assignee: Pantech Co., Ltd., Seoul (KR)

( * ) Notice: Subject to any disclaimer, the term of this patent is extended or adjusted under 35 U.S.C. 154(b) by 108 days.

(21) Appl. No.: 14/017,960

(22) Filed: Sep. 4, 2013

(65) Prior Publication Data

US 2014/0066140 A1 Mar. 6, 2014

(30) Foreign Application Priority Data

Sep. 5, 2012 (KR) ........................ 10-2012-0098310

(51) Int. Cl.
*H04M 1/00* (2006.01)
*H04M 1/02* (2006.01)

(52) U.S. Cl.
CPC ..................................... *H04M 1/026* (2013.01)

(58) Field of Classification Search
CPC ...................................................... H04M 1/026
USPC .............................................. 455/90.3, 575.1
See application file for complete search history.

(56) References Cited

U.S. PATENT DOCUMENTS

| | | | |
|---|---|---|---|
| 5,868,475 A * | 2/1999 | Shikata et al. ................. | 312/7.2 |
| 6,819,939 B2 * | 11/2004 | Masamura ................. | 455/550.1 |
| 7,512,425 B2 * | 3/2009 | Fukuda ....................... | 455/575.1 |
| 8,014,843 B2 * | 9/2011 | Birch et al. ................. | 455/575.4 |
| 8,068,635 B2 * | 11/2011 | Carlson et al. .................. | 381/426 |
| 8,189,851 B2 * | 5/2012 | Booth et al. .................. | 381/426 |
| 8,260,343 B2 * | 9/2012 | Eaton et al. ................. | 455/550.1 |
| 8,301,188 B2 * | 10/2012 | Demuynck et al. ......... | 455/550.1 |
| 8,391,515 B2 * | 3/2013 | Lu et al. ........................ | 381/150 |
| 2005/0180592 A1 * | 8/2005 | Miura .......................... | 381/401 |
| 2006/0094378 A1 * | 5/2006 | Murray et al. ................ | 455/128 |
| 2006/0210099 A1 * | 9/2006 | Takahata et al. .............. | 381/152 |
| 2007/0025582 A1 * | 2/2007 | Rashish et al. ................ | 381/388 |
| 2007/0116321 A1 * | 5/2007 | Jang et al. ..................... | 381/388 |
| 2012/0053711 A1 * | 3/2012 | Shedletsky et al. ............. | 700/94 |

FOREIGN PATENT DOCUMENTS

KR 10-2006-0057923 5/2006

\* cited by examiner

*Primary Examiner* — April G Gonzales
(74) *Attorney, Agent, or Firm* — H.C. Park & Associates, PLC

(57) ABSTRACT

A receiver, a mobile terminal including the receiver, and a method of disposing the receiver on the mobile terminal are disclosed. The mobile terminal including: a receiver including: a casing including walls and an inner space defined at least partially by the walls, a diaphragm driving unit disposed in the casing, a diaphragm including a central region disposed in the casing, a projection unit extending from the casing, the projection unit including walls and a receiver hole disposed in one of the walls, and an audio path defined within the casing walls and the projection unit walls; and a Printed Circuit Board (PCB) including a cutout along an edge. The diaphragm may be disposed between the diaphragm driving unit and the inner space, and the audio path extends from the diaphragm central region through the inner space to the receiver hole. The receiver may be disposed in the cutout in the PCB.

23 Claims, 9 Drawing Sheets

RECEIVER AND MOBILE COMMUNICATION TERMINAL INCLUDING THE RECEIVER

CROSS-REFERENCE TO RELATED APPLICATION(S)

This application claims the benefit under 35 U.S.C. §119 (a) of Korean Patent Application No. 10-2012-0098310, filed on Sep. 5, 2012, in the Korean Intellectual Property Office, which is hereby incorporated by reference for all purposes as if fully set forth herein.

BACKGROUND

1. Field

The following description relates to a receiver and a mobile communication terminal including the receiver.

2. Description of the Related Art

Mobile communication terminals, such as mobile phones, have been widely used for of personal communication allowing voice calls and wireless communication while users are moving around. In recent years, smartphones as intelligent terminals incorporating mobile phone functions and computer support functions, such as Internet communications and information search, have grown in popularity.

Generally, a smartphone has a bar-type case, allowing a user to easily search the Internet or use multimedia content through a large display screen. For example, the terminal has a display module disposed in the central portion of a terminal case. In addition, a microphone is placed in a lower portion of the terminal, and a receiver, i.e., speaker, is placed in a top portion. The microphone and the receiver are provided for voice calls, and the voice of a caller is transmitted from the microphone of the caller to the receiver of a listener.

In addition, a screen size of a display module has increased in response to an increasing demand of users for a larger screen suitable to search the Internet and use multimedia content. Accordingly, the overall size of the terminal has increased as well, thereby degrading the portability. Hence, a reduction of a distance between an edge of the display module and an edge of a terminal case can enhance the portability of the terminal and allow a better immersive experience for the user.

In related art, a receiver in a shape of circle, oval or rectangle is generally placed in a space between a top of a display module and a top of a terminal case. Because the receiver needs to be of a sufficient size to ensure a quality of voice call, there is a limitation in reducing the distance between an edge of the display module and an edge of the terminal case.

To reduce the space between the edge, such as a top edge, of the display module and the edge, such as a top edge, of the terminal case, the receiver can be disposed behind a rear surface of the display module. The increased distance between the receiver and a listener's ear results in a reduction in sound pressure. Further, the receiver may not sufficiently adhere to a printed circuit board (PCB) disposed on the rear surface of the display module, and an additional element is required to fix the receiver to the display module.

A receiver can have a tele-coil (T-coil) according to Hearing-Aid Compatibility (HAC) regulations. When a receiver including a T-coil is installed behind the rear surface of the display module, the distance between the top of the display module and the top of the terminal case can decrease. This reduction in a width between the display module and the terminal case can cause additional problems that can lead to limitations in design and performance degradation of the terminal.

SUMMARY

Exemplary embodiments of the present invention provide an apparatus and method for accessing a context for a message attachment.

The following discloses a receiver that provides increased freedom in designing a mobile communication terminal.

According to exemplary embodiments, there is provided a receiver including: a casing including walls and an inner space defined at least partially by the walls, a diaphragm driving unit disposed in the casing; a diaphragm including a central region disposed in the casing; a projection unit extending from the casing; the projection unit including walls and a receiver hole disposed in one of the walls; and an audio path defined within the casing walls and the projection unit walls.

According to exemplary embodiments, there is provided a mobile terminal including: a receiver including: a casing including walls and an inner space defined at least partially by the walls, a diaphragm driving unit disposed in the casing, a diaphragm including a central region disposed in the casing, a projection unit extending from the casing, the projection unit including walls and a receiver hole disposed in one of the walls, and an audio path defined within the casing walls and the projection unit walls; and a Printed Circuit Board (PCB) including a cutout along an edge. The receiver is disposed in the cutout in the PCB.

According to exemplary embodiments, there is provided a method for disposing a receiver in a mobile terminal. The method includes: providing a receiver including: a casing including walls and an inner space defined at least partially by the walls, a diaphragm driving unit disposed in the casing, a diaphragm including a central region disposed in the casing, a projection unit extending from the casing, the projection unit including walls and a receiver hole disposed in one of the walls, and an audio path defined within the casing walls and the projection unit walls; providing a Printed Circuit Board (PCB) including a cutout along an edge; and disposing the receiver into the cutout on the PCB. The diaphragm is disposed between the diaphragm driving unit and the inner space, and the audio path extends from the diaphragm central region through the inner space to the receiver hole.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

Figure 1:
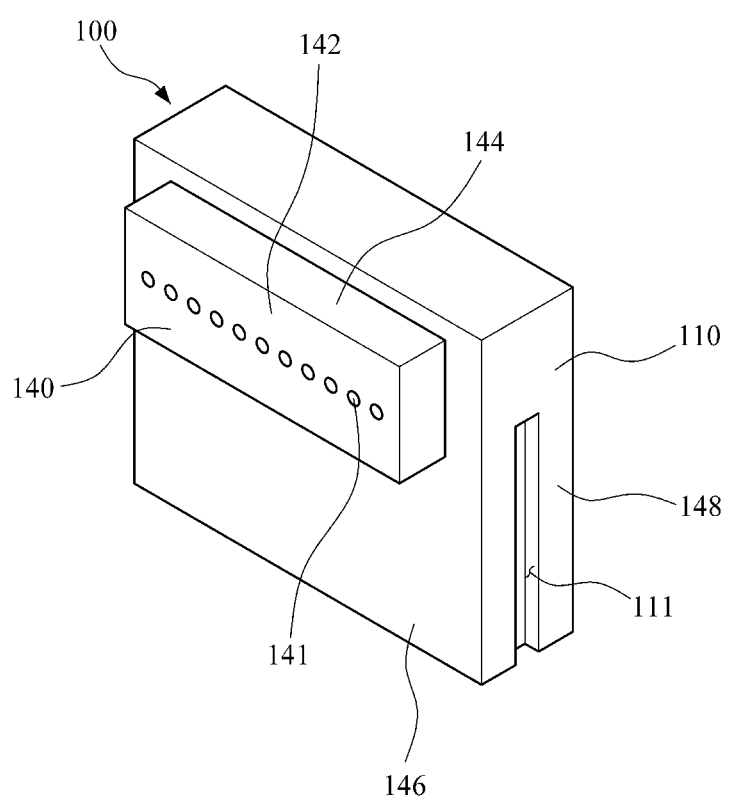
FIG. 1 is a perspective view of a receiver according to exemplary embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figure 2:
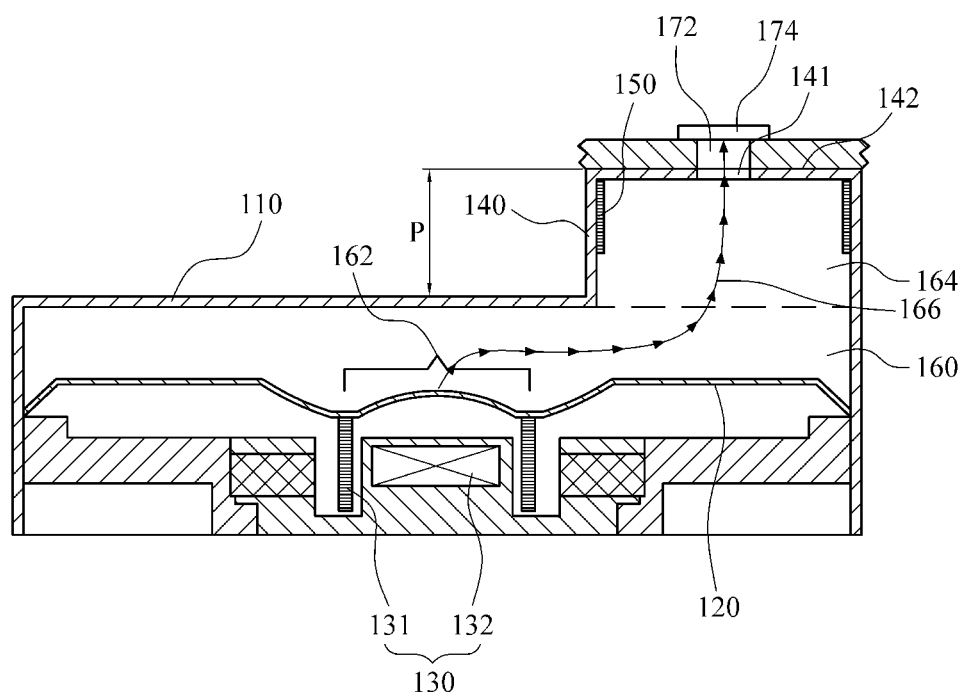
FIG. 2 is an internal view of the receiver illustrated in FIG. 1.

FIG. 1 is a perspective view of a receiver according to exemplary embodiments. FIG. 2 is an internal view of the receiver illustrated in FIG. 1.

Referring to FIGS. 1 and 2, a receiver 100 includes a casing 110, a diaphragm 120, a diaphragm driving unit 130, and a projection unit 140. Inside the casing 110, an inner space 160 is formed as shown in FIG. 2. Casing 110 can have a hexahedron shape, generally. Casing 110 can be defined by walls 146. Some of walls 146 of casing 110 can be sidewalls 148.

Although FIGS. 1 and 2 illustrate casing 110 in the shape of a hexahedron, casing 110 can vary in shape, for example, the casing 110 need not be regular or hexahedral and may be other than as shown such as another type of hexahedron. Diaphragm 120 is installed inside the casing 110. Diaphragm driving unit 130 is also installed inside casing 110. Diaphragm driving unit 130 receives an electrical signal and drives diaphragm 120 to generate an audio signal. Here, the electrical signal input to diaphragm driving unit 130 is generated by electrically converting an audio signal from a caller or application, such as a media player or alarm application.

For example, diaphragm driving unit 130 can be an electromagnetic type, including a voice coil 131 and a magnet 132. Voice coil 131 includes a first end connected to diaphragm 120. Voice coil 131 can include a second end left free or not connected to diaphragm 120. The first end of the voice coil 131 can be opposite the second end. Voice coil 131 can receive an electrical signal to be converted into an audio signal. Magnet 132 is arranged to apply a magnetic field to voice coil 131. For example, magnet 132 can be disposed opposite to a central portion 162 of diaphragm 120. Voice coil 131 can be a reel-type coil that is positioned apart from magnet 132 while surrounding magnet 132.

In response to an electrical signal, voice coil 131 moves forward and backward (back and forth) due to the application of a first magnetic field generated by voice coil 131. Voice coil 131 can also move back and forth by application of a second magnetic field that is generated by magnet 132. The first and second magnetic fields can vibrate diaphragm 120. The vibration results in generating an audio signal. Voice coil 131 can be a hollow cylinder having one end connected to diaphragm 120. Diaphragm driving unit 130 can vary in form. Diaphragm driving unit 130 can be, for example, a piezoelectric type unit.

Projection unit 140 projects or protrudes from a face, for example, an upper front face portion, of casing 110. Projection unit 140 can be defined by a protrusion wall 142 and one or more projection unit walls 144. The projection unit 140 may be of a hexahedral shape, generally. The one or more projection unit walls 144 of the projection unit 140 may extend from one of the hexahedral surfaces or walls 146 of the casing 110. Projection unit 140 includes one or more receiver holes 141 in the protrusion wall 142. The protrusion wall 142 may be a protruding front surface of the projection unit 140 and may connect or be disposed between the one or more projection unit walls 144 of the projection unit 140. There can be a number of receiver holes 141 arranged with or adjacent to each other. For example, the receiver holes 141 may be arranged in a line parallel with a long axis of the projection unit 140; however, aspects need not be limited thereto. The receiver holes 141 may be grouped or arranged in groups along the surface of the protrusion wall 142. The receiver holes 141 may be arranged in a shape or shapes. Only one receiver hole 141 may be present and may have a circular, elliptical, ovoid, or polygonal shape and may be elongated in a direction parallel with a long axis of the projection unit 140. Projection unit 140 has an inner space 164 communicating with inner space 160 of casing 110. An audio signal generated in inner space 160 of casing 110 is guided to receiver holes 141 along audio path 166. Audio path 166 extends from the diaphragm 120 through inner space 160 of the casing 110, through inner space 164 of projection unit 140, and is discharged through receiver hole 141. Audio path 166 can be non-linear. Receiver holes 141, the central portion 162 of diaphragm 120, and diaphragm driving unit 130 can be disposed along a non-linear path. Although FIG. 1 illustrates that projection unit 140 is hexahedral having a length shorter than the length of the casing 110, aspects need not be limited thereto such that projection unit 140 can vary in shape and size, and for example, can have an outwardly-protruding curved side surfaces, an inwardly-protruding curved surface, a surface configured to correspond to the curves of a human ear, or the like.

When diaphragm driving unit 130 is an electro-magnetic type unit, projection unit 140 can include a tele-coil (T-coil) 150. T-coil 150 amplifies an induction magnetic field generated by voice coil 131 and magnet 132 during the operation of receiver 100. This allows a user with a hearing aid to hear incoming sound more clearly. T-coil 150 can be installed on one or more inner side walls of projection unit 140. T-coil 150 can be wound along the inner side walls. When T-coil 150 is mounted on the inner side walls of projection unit 140, the volume of T-coil 150 can be increased, resulting in a more amplification of an induction magnetic field. T-coil 150 can be electrically connected to voice coil 131.

Figure 6:
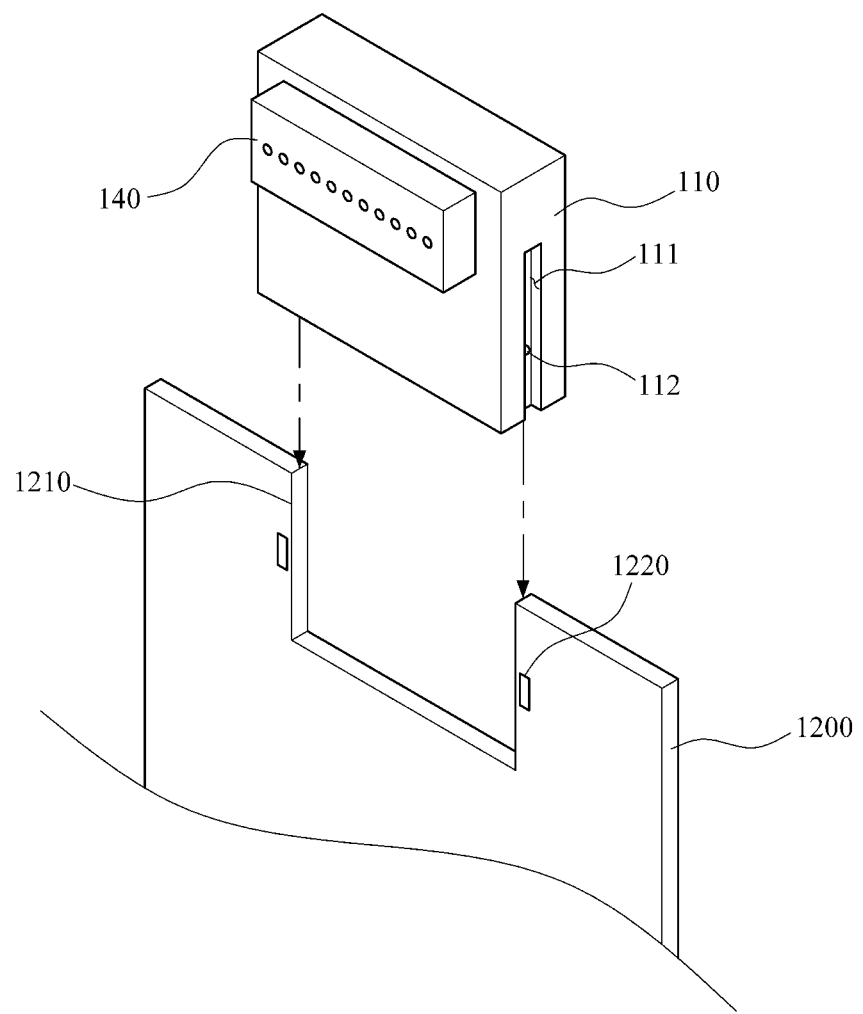
FIG. 6 is an exploded view of the receiver illustrated in FIG. 5 coupled to a PCB according to exemplary embodiments.

Casing 110 can include a guide groove 111 on one or more sides, for example, on each of the left and right sides. Each guide groove 111 can vertically extend and have an open lower end. Guide groove 111 allows casing 110 to be slidably coupled to a receiving portion 1210 of a printed circuit board (PCB) 1200 as illustrated in FIG. 6 and described later.

A glass plate 170 can be disposed on or near protrusion wall 142. Glass plate 170 can include a glass plate hole 172. Glass plate hole 172 can overlay or align with the at least on receiver hole 141. Glass plate hole 172 can comprise a single cutout or a plurality of holes through glass plate 170 corresponding to or independent of a number of receiver holes 141. A grill 174 can be disposed above glass plate hole 172.

Figure 3:
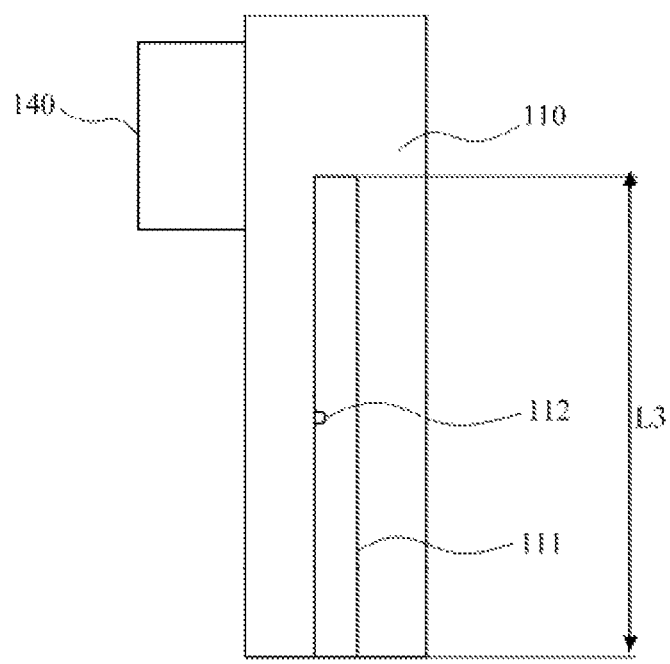
FIG. 3 is a cross-sectional view of the receiver illustrated in FIG. 1 including a contact terminal.

In addition, guide groove 111 can include a contact terminal 112 on an inside wall as illustrated in FIG. 3. FIG. 3 is a cross-sectional view of the receiver illustrated in FIG. 1 including a contact terminal. Contact terminal 112 is electrically connected to voice coil 131. When receiving portion 1210 of PCB 1200 is received by casing 110, for example, by being inserted in guide grooves 111, contact terminal 112 contacts with contact point 1220 disposed along the receiving portion 1210 of the PCB 1200. This enables an electrical signal from PCB 1200 to be input to voice coil 131. Contact terminal 112 can vary in form, such as a pogo-pin, a plate spring, and the like. Although contact terminal 112 and contact point 1220 are shown as plural and disposed on opposite sides of the guide groove 111 and receiving portion 1210, aspects need not be limited thereto. For example, a plurality of the contact terminals and corresponding contact points can be disposed in a first groove or along an edge of the receiver. Length L3 of guide grooves 111 can be different or be of variable length depending on the installation position of receiver 100.

Figure 4:
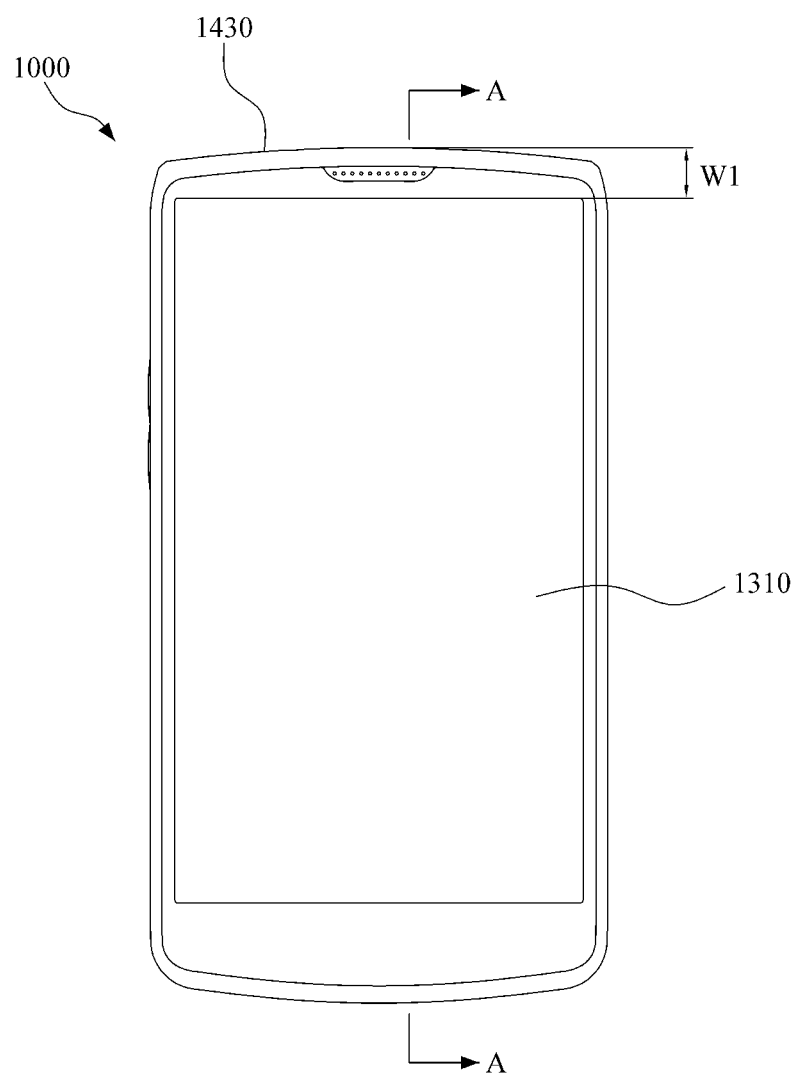
FIG. 4 illustrates a mobile communication terminal including the receiver illustrated in FIG. 1 according to exemplary embodiments.
Figure 5:
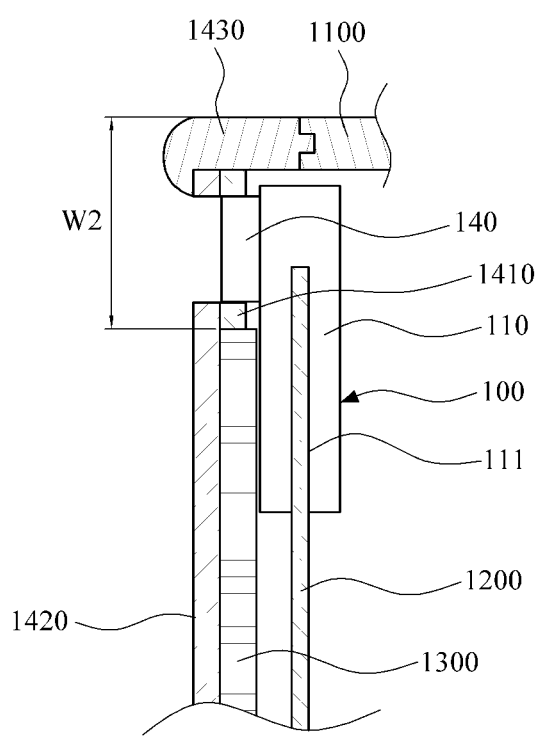
FIG. 5 is a cross-sectional view of the mobile communication terminal taken along line A-A of FIG. 4.

FIG. 4 illustrates a mobile communication terminal including the receiver illustrated in FIG. 1 according to exemplary embodiments of the present invention. FIG. 5 is a cross-sectional view of the mobile communication terminal taken along line A-A of FIG. 4.

Referring to FIGS. 4 and 5, mobile communication terminal 1000 can include receiver 100, a terminal case 1100, a PCB 1200, and a display module 1300. PCB 1200 is mounted inside terminal case 1100. PCB 1200 can include a control unit (not shown) to control the overall operation of mobile communication terminal 1000. Display module 1300 can be, for example, a liquid crystal display (LCD) module or an organic light emitting diode (OLED) module.

Display module 1300 is installed in such a manner that a display screen 1310 is exposed to a front portion of terminal case 1100. For example, terminal case 1100 has an open front portion. Display module 1300 is disposed in front of PCB 1200, and is arranged on or at the open front middle portion of terminal case 1100. A front cover 1410 covers the open front portion while exposing display screen 1310 of display module 1300 and receiver holes 141. A glass plate 1420 is disposed to cover the front cover 1410. Glass plate 1420 has an open portion at a position corresponding to a position of protrusion wall 142 of projection unit 140 so as to expose receiver holes 141. Glass plate 1420 need not overlay or cover receiver holes 141, and glass plate 1420 may include a cutout so as to not overlay or cover receiver holes 141. A bezel 1430 allows edges of the glass plate 1420 to be fixed on terminal case 1100. A touch window (not shown) can be mounted on a front surface of display module 1300. A button section (not shown) for receiving instructions can be provided proximate display screen 1310, for example, on a lower area of display screen 1310 of mobile communication terminal 100. Glass plate 1420 can comprise an integrated display and touch window.

Receiver 100 can be disposed in casing 110 behind a rear surface of the display module 1300 such that projection unit 140 protrudes toward the front upper portion of casing 110 to extend to an upper portion of the display module 1300. That is, casing 110 with diaphragm 120 and diaphragm driving unit 130 mounted therein is disposed behind a rear surface (not visible to the user) of display module 1300, while projection unit 140 is disposed above the top of the display module 1300. Projection unit 140 can have a width shorter than a width of casing 110.

A protruding length P (as shown in FIG. 2) of the projection unit 140 can be determined by a distance of PCB 1200 from display module 1300. That is, if it is needed to increase a distance from PCB 1200 to display module 1300, protruding length P of projection unit 140 is increased by a length corresponding to the increased distance. Conversely, if a distance from PCB 1200 to display module 1300 should be reduced, protruding length P of projection unit 140 is reduced by a length corresponding to the reduced distance, and projection unit 140 is disposed in the upper portion of the module 1300 without protruding beyond the front surface of display module 1300. Thus, even when a design of the distance from PCB 1200 to display module 1300 is changed, it is possible to be responsive to the design changes by adaptively determining the protruding length of projection unit 140.

As described above, only projection unit 140 of receiver 100 is disposed in the upper portion of display module 1300, and it is possible to further reduce a width W2 (see FIG. 5) between a top of the display module 1300 and a top of the terminal case 1100. Hence, it is possible to reduce a width W1 (see FIG. 4) between a top of display screen 1310 and a top of bezel 1430. This permits a greater degree of freedom in design of mobile communication terminal 100.

The T-coil 150 may be disposed inside projection unit 140, rather than inside casing 110, such that it is possible to expand a vibration range of diaphragm 120 by increasing the size of diaphragm 120. This permits a greater degree of freedom in design of diaphragm 120. A capacity of the magnet 132 and volume of the T-coil 150 can also be increased. Furthermore, the distance to a listener's hearing aid can be minimized as T-coil 150 is disposed adjacent to a front portion of mobile communication terminal 1000. By thus disposing T-coil 150, the intensity of the magnetic field generated by T-coil 150 is magnified.

Figure 7:
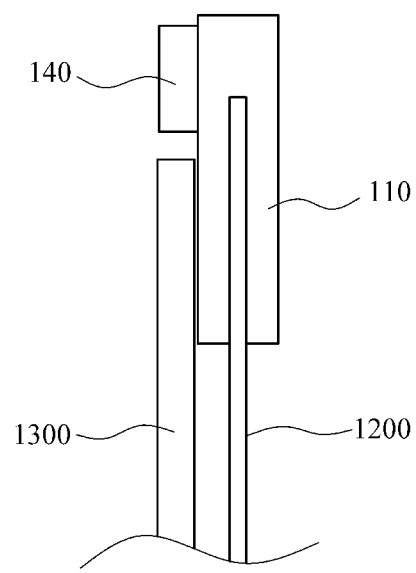
FIG. 7 is a side view of a receiver coupled to a PCB according to exemplary embodiments.

As illustrated in FIGS. 6 and 7, the PCB 1200 can include receiving portion 1210. Receiving portion 1210 can comprise a cut-out that is cut open from PCB 1200. Guide groove 111 of receiver 100 is disposed or received in receiving portion 1210, for example, each length of receiving portion 1210 is received by or inserted into a corresponding guide groove 111. PCB 1200 can include an electrical contact point 1220 to align, for example, with terminal 112 disposed on receiver 100 (see FIG. 3), when receiver 110 is fully inserted into receiving portion 1210. Contact point 1220 can contact terminal 112 disposed in guiding groove 111. Hence, receiver 100 can be slid onto PCB 1200 to be supported by and coupled to the PCB 1200 while simultaneously electrically connecting to PCB 1200.

Figure 8:
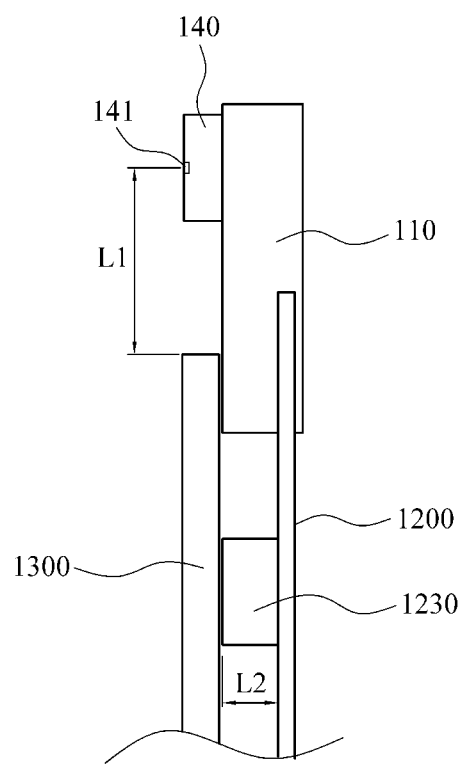
FIG. 8 is a side view of an exemplary receiver coupled to the PCB according to exemplary embodiments.

FIG. 8 is a side view of an exemplary receiver coupled to the PCB according to exemplary embodiments. The length L3 (shown in FIG. 3) of guide grooves 111 can be different in exemplary embodiments. Length L3 of guide groove 111 can be different depending on the installation position of receiver 100. For example, length L3 of guide grooves 111 can be determined by a distance L1 from the receiver holes 141 to the top of the display module 1300. When the distance L1 between receiver holes 141 and the top of display module 1300 is increased, length L3 of guide grooves 111 is reduced by a length corresponding to the increased distance between receiver holes 141 and top of the display module 1300. When distance L1 between receiver holes 141 and the top of display module 1300 needs to reduced, length L3 of guide grooves 111 is increased by a length corresponding to the reduced distance between receiver holes 141 and the top of display module 1300. Thus, even when distance L1 between receiver holes 141 and the top of display module 1300 is changed, it is possible to be responsive to design changes by adaptively determining length L3 of guide grooves 111.

A horizontal (forward or backward) position or placement of guide grooves 111 can be determined according to a protruding length L2 of an electronic part 1230 mounted on the front surface of PCB 1200. For example, if electronic part 1230 with an increased protruding length L2 is mounted on PCB 1200, guide grooves 111 are disposed further from a front-facing surface of casing 110 by a length corresponding to increased protruding length L2. If electronic part 1230 with a reduced protruding length L2 is mounted on PCB 1200, guide grooves 111 are disposed closer to the front-facing surface of casing 110 by a length corresponding to the reduced protruding length L2. As such, the horizontal positioning of guide grooves 111 is determined to dispose projection unit 140 in the upper portion of display module 1300 while not protruding from the front surface of display module 1300. Accordingly, even when there are changes in design of electronic part 1230 mounted on PCB 1200, the horizontal position of guide grooves 111 can be adaptively determined, and thus it is possible to be responsive to the design changes. As a result, diversification in design of mobile communication terminal 1000 can be achieved. In some embodiments, the depth of casing 110 can be the thickest portion, i.e., can be L2.

Figure 9:
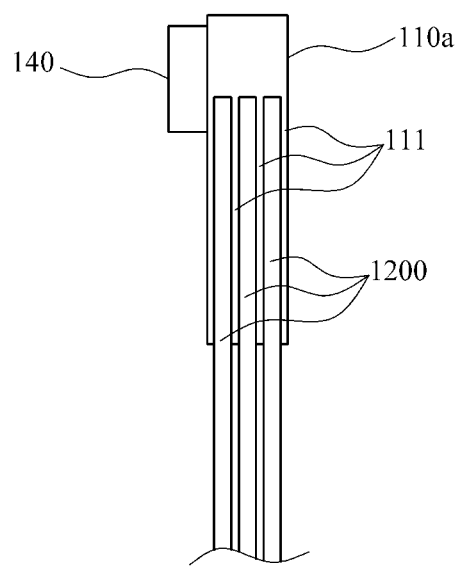
FIG. 9 is a side view of a receiver coupled to a plurality of PCBs according to exemplary embodiments.

FIG. 9 is a side view of a receiver coupled to a plurality of PCBs according to exemplary embodiments. As illustrated in FIG. 9, receiver 100 can be coupled to a plurality of PCBs 1200. In this case, each of the PCBs 1200 provides a receiving portion that is cut open along an edge, for example, top edges of PCBs 1200. A casing 110a includes a plurality of guide grooves 111 on its side faces to receive both sides of each receiving portion of PCBs 1200. Accordingly, receiver 100 can be slid from the top of the PCBs 1200 to be supported by and coupled to the PCBs 1200.

As described above, a receiver may include a casing disposed in a direction of a rear surface of a display module, i.e., the diaphragm and voice coil are disposed behind the display, and a projection unit disposed above a top of the display module and protruding from an upper front surface of the casing to a front surface of the display module. Thus, it is possible to reduce a distance between the top of the display module and a top of a terminal case. Hence, a degree of freedom in design of a mobile communication terminal can be increased.

Moreover, according to the exemplary embodiments of the present invention, a T-coil may be disposed inside the projection unit, and thus it is possible to increase the size of a diaphragm and thereby expand a vibration range of the diaphragm and to increase a degree of freedom in design of a diaphragm. Additionally, it is also possible to increase the capacity of a magnet and the volume of the T-coil. Furthermore, a distance to a hearing aid of a listener can be decreased since the T-coil is disposed close to a front face of the mobile communication terminal, and thus magnetic field intensity is less reduced.

A number of examples have been described above. Nevertheless, it should be understood that various modifications can be made. For example, suitable results can be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receiver for a mobile terminal, the receiver comprising:
   a casing including walls and an inner space defined at least partially by the walls;
   a diaphragm driving unit disposed in the casing;
   a diaphragm including a central region disposed in the casing;
   a projection unit extending from the casing, the projection unit including walls and a receiver hole disposed in one of the walls; and
   an audio path defined within the casing walls and the projection unit walls.

2. The receiver of claim 1 further comprising a guide groove disposed on an outer wall of the casing.

3. The receiver of claim 2 further comprising an electrical contact disposed in the guide groove.

4. The receiver of claim 1 further comprising an electrical contact disposed on an outer wall of the casing.

5. The receiver of claim 1 wherein the projection unit includes an inner space disposed between the receiver hole and the inner space of the casing.

6. The receiver of claim 1 wherein the receiver hole comprises a plurality of holes.

7. The receiver of claim 1, further comprising a tele-coil (T-coil) disposed in the projection unit adjacent the receiver hole.

8. The receiver of claim 1 wherein the audio path comprises a non-linear path.

9. The receiver of claim 1 wherein the diaphragm is disposed between the diaphragm driving unit and the inner space, and the audio path extends from the diaphragm central region through the inner space to the receiver hole.

10. A mobile terminal comprising:
a receiver including:
  a casing including walls and an inner space defined at least partially by the walls,
  a diaphragm driving unit disposed in the casing,
  a diaphragm including a central region disposed in the casing,
  a projection unit extending from the casing, the projection unit including walls and a receiver hole disposed in one of the walls, and
  an audio path defined within the casing walls and the projection unit walls; and
a Printed Circuit Board (PCB) including a cutout along an edge;
wherein the receiver is disposed in the cutout in the PCB.

11. The mobile terminal of claim 10, further comprising:
a display module; and
a glass plate,
wherein the display module is disposed between the glass plate and the PCB, and the projection unit of the receiver disposed on the PCB extends beyond an edge of the display module.

12. The mobile terminal of claim 11 wherein the glass plate includes a hole that aligns with the receiver hole.

13. The mobile terminal of claim 11 wherein the receiver hole comprises a plurality of receiver holes and the glass plate includes a cutout that aligns with a length of the plurality of receiver holes.

14. The mobile terminal of claim 10 wherein the receiver further comprises a guide groove disposed on an outer wall of the casing, and the cutout in the PCB is slid into the guide groove of the receiver.

15. The mobile terminal of claim 14 wherein the receiver further comprises an electrical contact disposed in the guide groove, and the PCB comprises an electrical contact point that contacts the electrical contact when the PCB is disposed in the guide groove of the receiver.

16. The mobile terminal of claim 10 wherein the receiver further comprises a tele-coil (T-coil) disposed in the projection unit adjacent to the receiver hole.

17. The mobile terminal of claim 10 wherein the PCB comprises a plurality of PCBs each including a cutout and the receiver comprises a plurality of guide grooves disposed on an outer wall of the casing, and each cutout in the plurality of PCBs is slid into a corresponding guide groove of the plurality of guide grooves.

18. The mobile terminal of claim 10 wherein the diaphragm is disposed between the diaphragm driving unit and the inner space, and the audio path extends from the diaphragm central region through the inner space to the receiver hole.

19. A method for disposing a receiver in a mobile terminal, the method comprising:
providing a receiver including:
  a casing including walls and an inner space defined at least partially by the walls,
  a diaphragm driving unit disposed in the casing,
  a diaphragm including a central region disposed in the casing,
  a projection unit extending from the casing, the projection unit including walls and a receiver hole disposed in one of the walls, and
  an audio path defined within the casing walls and the projection unit walls,
  wherein the diaphragm is disposed between the diaphragm driving unit and the inner space, and the audio path extends from the diaphragm central region through the inner space to the receiver hole; and
providing a Printed Circuit Board (PCB) including a cutout along an edge; and
disposing the receiver into the cutout on the PCB.

20. The method of claim 19, further comprising:
providing a display module; and
providing a glass plate;
wherein the display module is disposed between the glass plate and the PCB, and the projection unit of the receiver extends over the display module.

21. The method of claim 20, wherein the glass plate includes a hole, and the method further comprises aligning the glass plate hole with the receiver hole.

22. The method of claim 20 wherein the receiver further comprises a guide groove disposed on an outer wall of the casing, and the method further comprises sliding the cutout in the PCB into the guide groove of the receiver.

23. The method of claim 22, wherein the receiver further comprises an electrical contact disposed in the guide groove, and the PCB comprises an electrical contact point that contacts the electrical contact when the PCB is disposed in the guide groove of the receiver.

* * * * *